United States Patent
Tao (10) Patent No.: US 7,191,169 B1
(45) Date of Patent: Mar. 13, 2007

(54) SYSTEM AND METHOD FOR SELECTION OF MATERIALIZED VIEWS

(75) Inventor: Dongbin Tao, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 399 days.

(21) Appl. No.: 10/345,565

(22) Filed: Jan. 16, 2003

Related U.S. Application Data (60) Provisional application No. 60/381,790, filed on May 21, 2002.

(51) Int. Cl.
G06F 7/00 (2006.01)
G06F 17/00 (2006.01)
G06F 17/30 (2006.01)

(52) U.S. Cl. .................... 707/2; 707/3; 707/6; 707/102
(58) Field of Classification Search .............. 707/1–7, 707/10, 100–102, 104.1
See application file for complete search history.

(56) References Cited

U.S. PATENT DOCUMENTS

| | | | | |
|---|---|---|---|---|
| 5,864,842 A | * | 1/1999 | Pederson et al. ............. | 707/3 |
| 5,991,754 A | * | 11/1999 | Raitto et al. ................ | 707/2 |
| 6,026,390 A | * | 2/2000 | Ross et al. .................. | 707/4 |
| 6,125,360 A | * | 9/2000 | Witkowski et al. .......... | 707/2 |
| 6,141,655 A | * | 10/2000 | Johnson et al. .............. | 707/2 |
| 6,438,542 B1 | * | 8/2002 | Koo et al. .................... | 707/4 |
| 6,449,605 B1 | * | 9/2002 | Witkowski .................... | 707/3 |
| 6,480,836 B1 | * | 11/2002 | Colby et al. ................. | 707/3 |
| 6,493,699 B2 | * | 12/2002 | Colby et al. ................. | 707/2 |
| 6,510,422 B1 | * | 1/2003 | Galindo-Legaria et al. ... | 707/2 |
| 6,567,802 B1 | * | 5/2003 | Popa et al. ................... | 707/3 |
| 6,757,670 B1 | * | 6/2004 | Inohara et al. ............... | 707/3 |
| 6,850,933 B2 | * | 2/2005 | Larson et al. ................ | 707/4 |

OTHER PUBLICATIONS

Markl, V, Frank Ramsak and Rudolf Bayer (1999), Improving OLAP Performance by Multidimensional Hierarchical Clustering, pp. 165-177.*

Harinarayan et al., Implementing Data Cubes Efficientlly, 1995, 25, Department of Computer Science, Stanford University, Stanford, CA 94305-2140.

Randall et al, Materialized Views in Oracle, Proceedings of the 24th VLDB Conference New York, USA, 1998, 659-664.

* cited by examiner

*Primary Examiner*—Don Wong
*Assistant Examiner*—Merilyn Nguyen
(74) *Attorney, Agent, or Firm*—Bingham McCutchen LLP (57) ABSTRACT

A method for selecting and recommending materialized views is described, in which a set of workload queries is classified in terms of a number of structural features that includes the structure of the join operations in the query ("full query join graph"), the structure of a specific subset of the join operations ("anchor join graph"), and other characteristics such as the measures, selection predicates, and grouping conditions employed in the query. These features are used to implement a two-level partitioned search for the recommended materialized views.

14 Claims, 7 Drawing Sheets

SALES (FACT) TABLE 100

| DATE 101 | STORE 103 | SALES 105 |
|---|---|---|
| 01/02/2001 | 0001 | $ 5,500 |
| 01/02/2001 | 0002 | $ 6,000 |
| 01/02/2001 | 0003 | $ 5,000 |
| ... | ... | ... |
| 07/05/2001 | 0001 | $ 4,500 |
| 07/05/2001 | 0002 | $ 7,000 |
| 07/05/2001 | 0003 | $ 8,000 |
| ... | ... | ... |

TIME (DIMENSION) TABLE 110

| DATE 111 | MONTH 113 | QUARTER 115 |
|---|---|---|
| 01/02/2001 | JANUARY | Q1 |
| ... | ... | ... |
| 07/05/2001 | JULY | Q3 |
| ... | ... | ... |

STORE (DIMENSION) TABLE 120

| STORE 121 | REGION 123 | STATE 125 |
|---|---|---|
| 0001 | 94065 | CA |
| 0002 | 03064 | NH |
| 0003 | 20231 | DC |
| ... | ... | ... |

```
501       503                              QUERY 500
  SELECT COUNT(*)

511     513    515    517    519
  FROM SALES, TIME, STORE, MONTH 521                523
  WHERE SALES.DATE = TIME.DATE
                      525
    AND SALES.STORE = STORE.STORE
                      527
    AND TIME.MONTH = MONTH.MONTH 531              533         535
  GROUP BY TIME.MONTH, STORE.STORE;
```

SYSTEM AND METHOD FOR SELECTION OF MATERIALIZED VIEWS

RELATED APPLICATION

The present application claims the benefit of U.S. Provisional Patent Application 60/381,790, entitled "Using Workload Classification to Improve Materialized View Selection" filed on May 21, 2002 by Dongbin Tao, the contents of which are incorporated by reference herein in their entirety.

FIELD OF THE INVENTION

The present invention relates to database systems and more particularly to selection of views for materialization.

BACKGROUND OF THE INVENTION

Relational databases store information in collections of tables, in which each table is organized into rows and columns. A popular application of relational database technology is data warehousing, in which an organization's data repository is designed to support the decision-making process for the organization. Many data warehouses are characterized by a "star schema," which employs a very large table called a "fact table" and many smaller lookup tables called "dimension tables." A fact table contains information collected for analysis, and dimension tables contain information about the attributes of the data in the large fact table.

Figure 1:
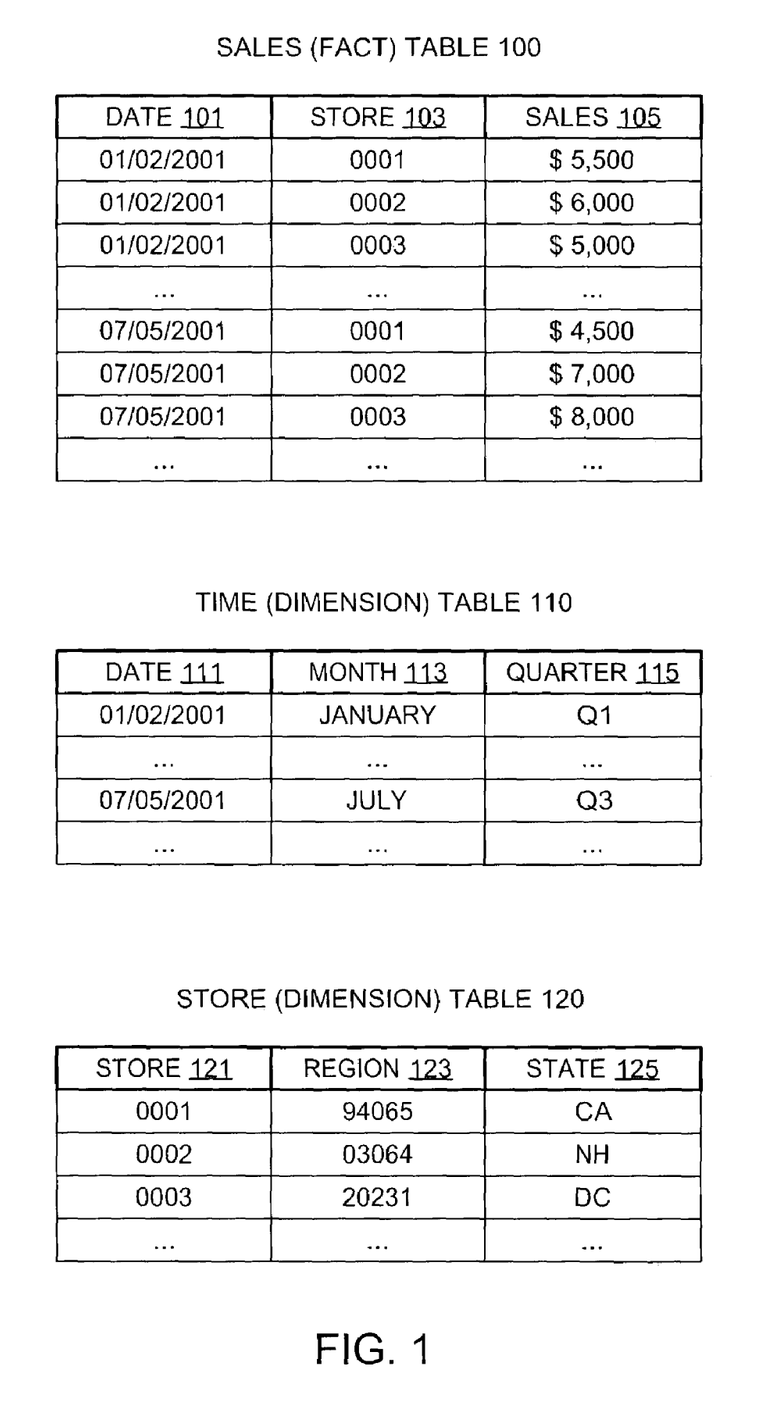
FIG. 1 shows exemplary fact and dimensional tables used to illustrate the process of selecting materialized views.

FIG. 1 illustrates an exemplary database containing three tables, a sales table 100, a time table 110, and a store table 120, useful for recording and organizing information about a company's sales operation. In this example, the sales table 100 is a fact table, and the time table 110 and the store table 120 are dimension tables. The columns of the sales table 100 hold attributes for the sales made by the company, including the date in a date column 101, the store identifier in a store column 103, and the daily sales amount in a sales column 105. Information about the daily sales of each of the company's store is stored in a row of the sales table 100. For example, the first row has an entry on Jan. 2, 2001 (in the date column 101) for store 0001 (in the store column 103), which had sales of $5,500 (in the sales column 105). Similarly, the second row has an entry on Jan. 2, 2001 for store 0002, which had sales of $6,000, and the third row has an entry for sales of $5,000 on Jan. 2, 2001 for store 0003. The sales table 100 also has rows for the sales that occurred on Jul. 5, 2001 in the amounts of $4,500, $7,000, and $8,000 for stores 0001, 0002, and 0003, respectively.

The other tables, time table 110 and store table 120, are dimension tables, which characterizes the sales table 100's date column 101 and store column 103, respectively. The time table 110 holds information in columns that indicate how the time is to be measured. In this example, the time table 110 has a date column 111, a month column 113, and a quarter column 115. The date column 111 is a unique/primary key column that organizes each date in terms of its month and quarter; e.g. date Jan. 2, 2001 has a value of January in the month column 113 and a value of Q1 in the quarter column 115, and the date Jul. 5, 2001 is in the month of July and in the Q3 quarter. The store table 120 holds information in columns that indicate how the stores are geographically located. In this example, the store table 120 has a store column 121, a month column 123, and a state column 125. The store column 121 is a unique/primary key column that organizes each unique identifies each store, indicate the ZIP code of the store in the region column 123 and the state of the store in the state column 125; e.g. store 0001 is in the 94065 ZIP code (in the region column 123) and in California (in the state column 125). Similarly, stores 0002 and 0003 are in the 03064 and 20231 ZIP codes and in the states of New Hampshire and Washington, D.C., respectively.

A database user retrieves information from the tables of a relational database by entering input that is converted to queries by a database application, which submits the queries to a database server. In response to receiving a query, the database server accesses the tables specified in the query to determine which information within the tables satisfies the query. The information that satisfies the queries is then retrieved by the database server and transmitted to the database application and ultimately presented to the user. Database servers are also capable of combining or "aggregating" information contained in different tables in response to a query. For example, one query for the exemplary database is to list the number of stores having sales grouped by month and store.

For any given database application, the queries must conform to the rules of a particular query language. Most query languages provide users with a variety of ways to specify information to be retrieved. For example, in the Structured Query Language (SQL), the following query requests the retrieval of a list of the number of the stores having sales grouped by month and store:

[STATEMENT 1]

```
SELECT COUNT(*)
FROM SALES, TIME, STORE
WHERE SALES.DATE = TIME.DATE AND SALES.STORE = STORE.STORE
GROUP BY TIME.MONTH, STORE.STORE;
```

This query performs a join operation on the product table 500 and the sales table 510. A join operation combines rows from two or more relational database objects, such as tables, views, or snapshots. To process a join operation, the database server combines pairs of rows that satisfy the join conditions and the other predicates. A join is performed whenever multiple tables appear in the FROM clause of query. The SELECT list of the query can reference any of the columns from any of the base objects listed in the FROM clause. Most join queries contain a WHERE clause that contains a predicate that compares two columns, each from a different joined object. Such predicates are referred to join conditions.

A "star query" is a specific kind of query that is often used in a star schema, because techniques have been developed for the efficient processing of star queries. In particular, a star query is a query that contains one of more joins of a fact table with a corresponding dimension table, but none of the dimension tables are joined together, as specified in the join conditions. The exemplary query of STATEMENT 1 is a star query, because each dimension table, namely the time table 110 and store table 120, are joined to the fact table, i.e. sales table 100, but neither the time table 110 nor the store table 120 are joined to each other.

For various reasons, it is desirable to define views that present results of queries. For example, views are often used to provide security by hiding sensitive information or simplify commands for a user by hiding the complexity of the database. A view is a logical table, and as logical tables, views can be queried just as if they were tables. The data that views actually present, however, is extracted or derived from other database objects, which may in fact be tables, other views, or snapshots. Columns and tables that are mapped to a view are referred to herein as base columns and base tables of the view, respectively.

A view is defined by metadata referred to as a view definition, which is typically in the form of a database query. For example, to create a view "RESULTS for presenting the results of the query of STATEMENT 1, the following STATEMENT 2 may be issued to define the view:

---

[STATEMENT 2]

CREATE VIEW RESULTS AS
SELECT COUNT(*)
FROM SALES, TIME, STORE
WHERE SALES.DATE = TIME.DATE AND SALES.STORE = STORE.STORE
GROUP BY TIME.MONTH, STORE.STORE;

---

A materialized view is a view for which a copy of the view data is stored separately from the base tables of the materialized view. Since the view data is persistently stored, the view data is not required to be regenerated every time a query accesses the view, eliminating overhead associated gathering and deriving the view. In order to provide up-to-date view data, however, materialized views must be maintained to reflect the current state of the base tables. When the base tables of a materialized view are modified, corresponding changes are made to the materialized view. Using a materialized view can lead to a cost savings compared with use of a conventional view when the materialized view presents a set of data that is infrequently changed but frequently accessed, especially when the defining query is costly to calculate.

Materialized views thus contain redundant information to improve query performance, because queries can be rerouted to reference the materialized views instead of the original set of tables. Materialized views typically contain GROUP BY and selection predicates. The sizes of the materialized views are often much smaller than those of the original tables referenced by the materialized views. Rerouted queries may have much better query response time, and the kernel of some relational database management systems route the queries according to structural features of the queries and the existing materialized views.

Given a small set of tables, there are many ways to create materialized views to handle the various queries submitted by users, but it is not practical to create materialized views to handle every possible query because materialized views occupy disk storage and take time to build. After the original tables are updated, all of the materialized views based on the original tables must be refreshed, consuming valuable computation resources. For a given workload (e.g. a pattern exhibited by queries submitted by users in a particular deployment environment such as a customer site), different sets of materialized views have different cost/benefit tradeoffs. Accordingly, there is a need for applying workload query information to select a set of materialized views to improve the overall query performance of the workload within given storage constraints.

Figure 2:
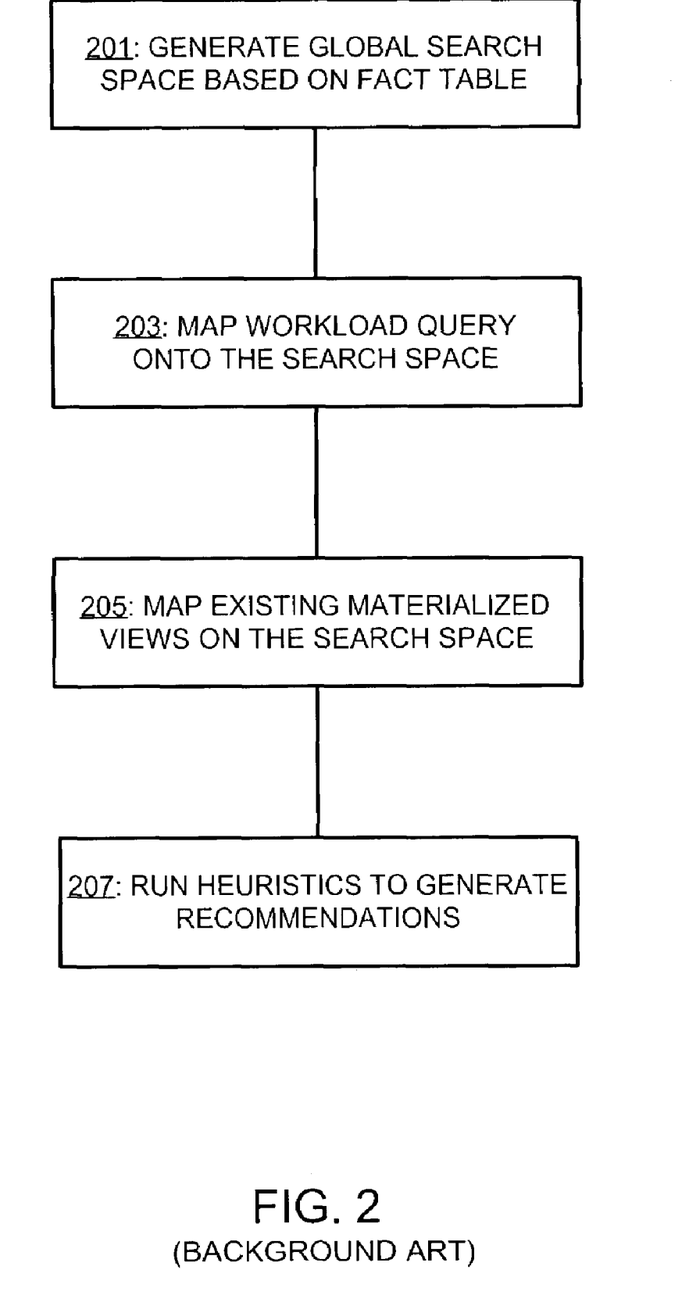
FIG. 2 is a flowchart showing the operation of a prior materialized view selection process.

Previously, identifying which materialized views to create that nearly optimize the workload's query performance within the storage constraints was performed by a stand-alone tool that performs the steps shown in FIG. 2. A step 201, the tool generates a search space based on a fact table and a set of dimension tables submitted by a user. The search space is composed of queries referencing the fact table and zero or more dimension tables. All the dimension tables in these queries are joined either to the fact table or to other dimension tables through foreign keys. Furthermore, queries in the search space differ by groupings (e.g. in the GROUP BY clause). The total number of queries in a search space may be characterized by the formula: $\pi(L_i+1)$, where i iterates from 1 to n, the number of dimensions referenced in the fact table, $L_i$ is the number of levels for the ith dimension.

Figure 3:
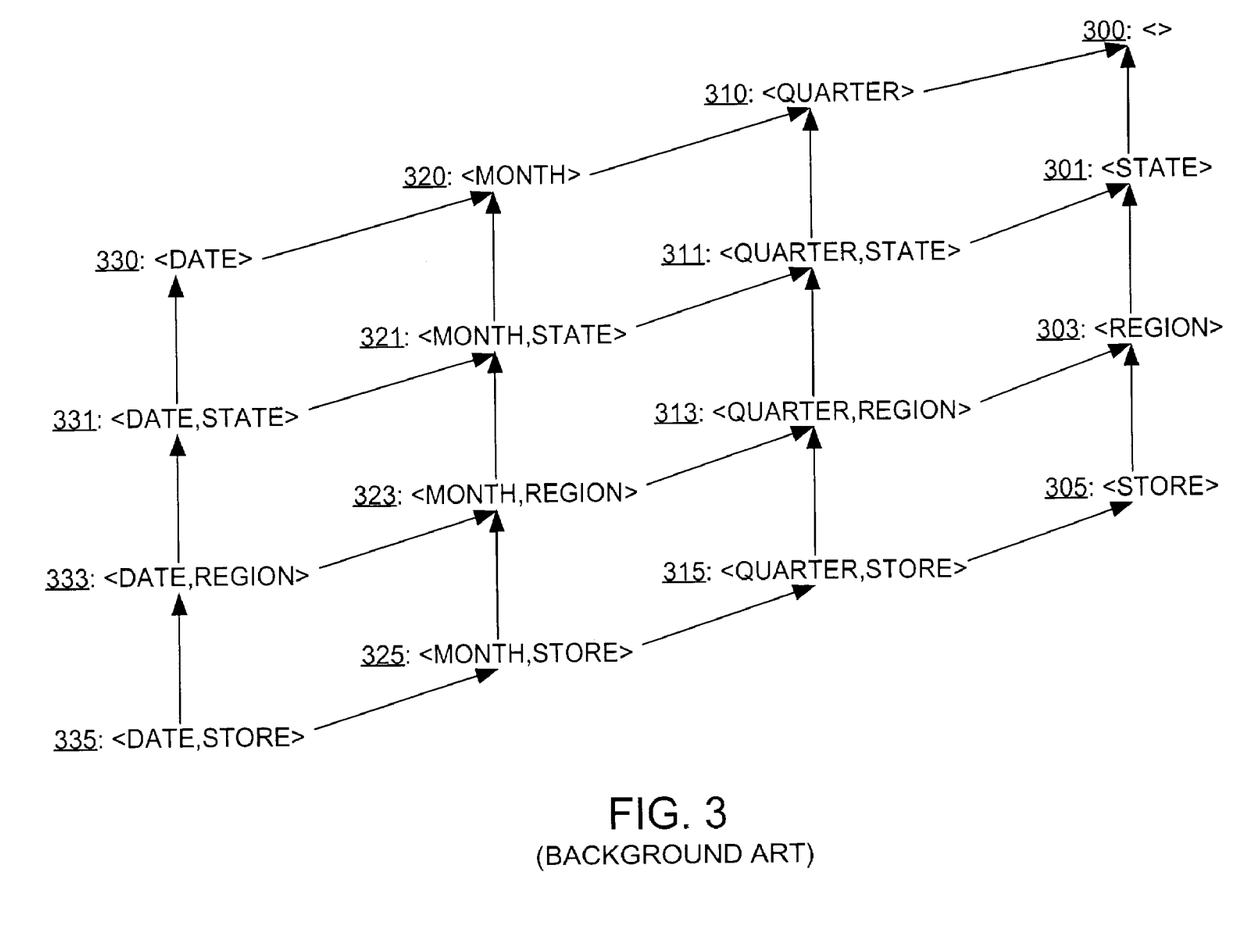
FIG. 3 is a lattice that represents the search space of selecting materialized views.

In the example illustrated in FIG. 1 and STATEMENT 1, the fact table is sales table 100, and the dimension tables are time table 10 and store table 120. The time dimension has three levels: date 111, month 113, and quarter 115, and the store dimension also has three levels: store 121, region 123, and state 125. The search space takes the form of a lattice, which, as shown in FIG. 3 for this example, has the sixteen points 300< >, 301<STATE>, 303<REGION>, 305 <STORE>, 310<QUARTER>, 311<QUARTER, STATE>, 313<QUARTER, REGION>, 315 <QUARTER, STORE>, 320<MONTH>, 321<MONTH, STATE>, 323<MONTH, REGION>, 325<MONTH, STORE>, 330<DATE>, 331<DATE, STATE>, 333<DATE, REGION>, 335 <DATE, STORE>. Each point represents a workload query's grouping condition. For example, the grouping condition in the query of STATEMENT 1 is <MONTH, STORE>, which corresponds to point 325 of the search space. The arrow between a pair of points representing queries indicates that the query on the "from" side, if materialized, can be used to answer a query on the "to" side. If the size of the "from" query is much smaller than the size of the fact table, the query response time of the "to" query can be dramatically improved by accessing a pre-computed materialized view based on the "from" query.

For example, a materialized view that was created based on the query of STATEMENT 1, grouping by month and store, can be used to answer queries that group by month and region (point 323) or that group by quarter and store (point 315). This relationship is transitive, such that the materialized view based on the query at point 325<MONTH, STORE> can be used by queries corresponding to any point ultimately reachable from point 325<MONTH, STORE> by one or more arrows. For example, a query at point 320<MONTH>, grouping only by month, can use the materialized view based on the query of STATEMENT 1, which groups by month and store. The null query at point 300< >, which has no grouping, can use any materialized view in FIG. 3, while a query with the most specific grouping, that by date and store, can only use a materialized view corresponding to point 335<DATE, STORE>, which for all intents and purposes tantamount to the original fact table 100.

At step 203, the tool maps the workload queries onto the search space. For example, if a workload query groups by month and store, then that query is mapped to the <MONTH, STORE> point 325. The points in the search space lattice are not all of equal importance because not all workload queries are of equal importance. Some workload queries are more frequent than others. Accordingly, a counter is maintained for each point in the search space lattice to record the total frequencies of the workload queries. Given the strict format of the queries in the search space, the tool can only map star queries onto the search space.

At step 205, existing materialized views are also mapped to the search space. This is to account for the fact that it is generally less expensive to keep an existing materialized view than generate a new materialized view. These materialized views are evaluated for their usefulness in satisfying the previously mapped incoming queries. Specifically, the tool attempts to minimize the average time taken to evaluate the workload queries within the constraint that there is a fixed number of materialized views or a fixed, total amount of space for any number of materialized views. This optimization problem is known to be NP-complete, which makes it cost-prohibitive to exhaustively search all of the possible combinations of materialized views for the best performance within the constraints.

Accordingly, at step 207, heuristics are employed to produce approximate, near-optimal solutions that terminate much sooner than the exhaustive search. One such heuristic is the greedy algorithm described by V. Harinarayam, Anand Rajaraman, Jeffrey D. Ullman, "Implementing Data Cubes Efficiently" in *Proc. ACM SIGMOD* 1996 (Montreal: ACM, June 1996) pp. 205–216, the contents of which are incorporated by reference in their entirety herein. The Harinarayam et al. greedy algorithm has a complexity of $O(n^2)$, where n is the number of points in the search space, and selects a subset of points as candidate for materialized views that delivers a near-optimal performance/cost ratio from a given search space.

SUMMARY OF THE INVENTION

The present invention stems from the recognition of several problems intrinsic to the approach illustrated in FIG. 2. For example, there is a need for a more general mechanism for selecting materialized views, because the FIG. 2 approach is limited to star queries with explicit dimension definitions. There is also a need to improve the quality of materialized view selection because the standalone tool is ignorant of exactly which queries are rewritten by the database kernel. Furthermore, performance is critical, and the materialized view selection of the prior approach is very slow because the global search space grows rapidly as the number of dimensions and their levels increase, even though many points in the search space are of little practical interest.

The present invention addresses these needs by classifying the workload queries in terms of a number of features that are designed to improve the generality, quality, and performance of the materialized view selection process. The features may include the structure of all join operations in the query referred as the "full query join graph," the structure of a specific subset of the join operations, referred to as an "anchor join graph," and other characteristics such as the measures, selection predicates, and grouping conditions employed in the query.

Accordingly, one aspect of the present invention relates to a method and software for selecting materialized views based on a plurality of user-supplied queries, in which each query is classified in terms of a full query join graph and an anchor join graph and the materialized views are selected based on this classification. In particular, use of the anchor join graph improves generality by also allowing for non-star queries and non-dimensional schemas to be handled and improves performance because each set of queries that correspond to the same anchor join graph can be searched independently. Use of the full query join graph advantageously enables a two-level partitioned search strategy to be implemented, which achieves a substantial speedup because smaller spaces are searched first to generate local recommendations and then merged to form global recommendations.

Another aspect of the present invention improves the quality of the materialized view selection by filtering the user-supplied queries to eliminate queries that are rewritten by a database kernel from the selection process. The remaining queries are classified in terms of one or more structural features and then selected based on their classified features. Filtering out queries that can already be rewritten by the database kernel advantageously focuses the materialized view selection process on those queries whose performance most needs to be improved, i.e. those queries that are not already being rewritten.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for selecting materialized views are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Workload Classification

Figure 4:
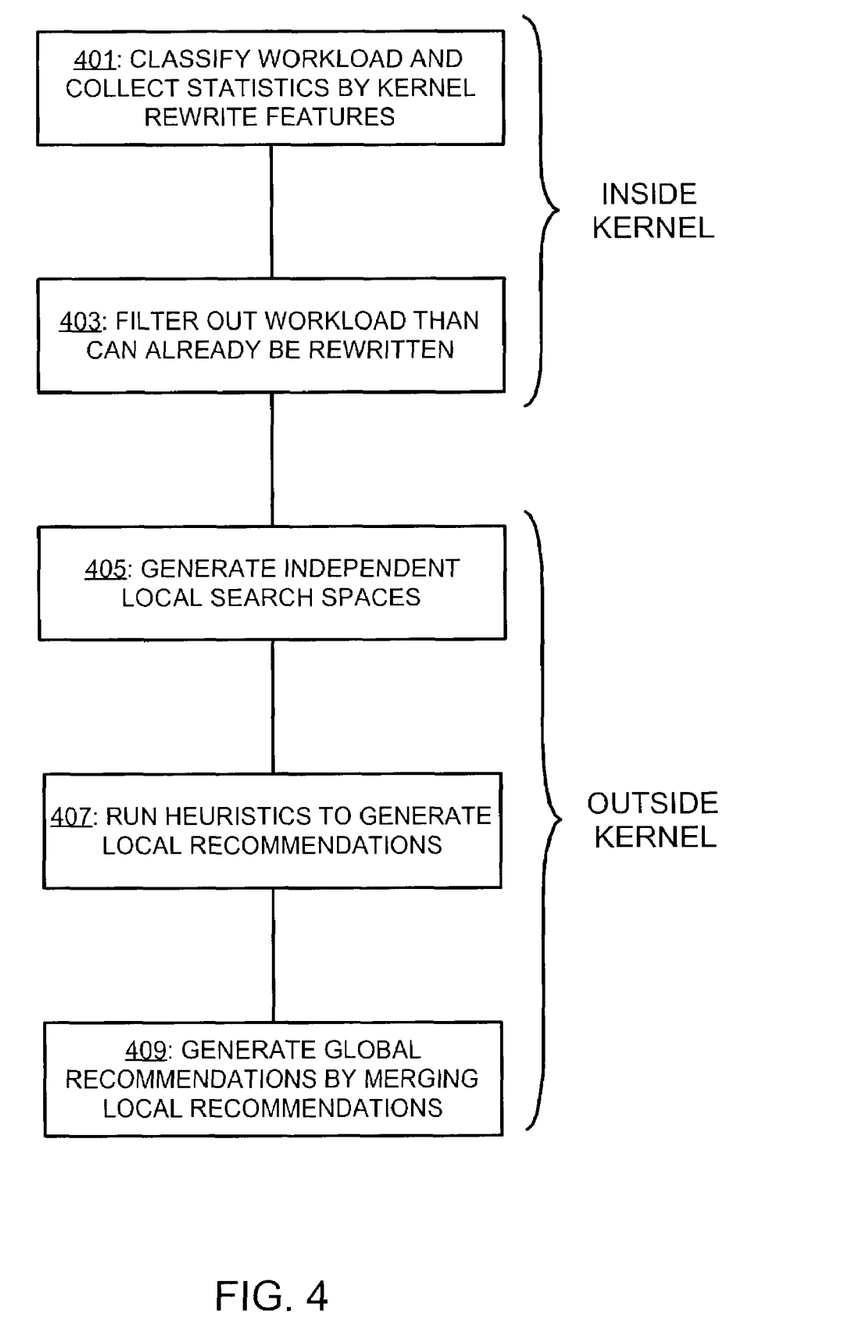
FIG. 4 is a flowchart illustrating the operation of one embodiment of the present invention.

Referring to FIG. 4, depicted is a flowchart that illustrates the operation of one embodiment of the present invention. At step 401, the workload is classified in accordance with various structural features of the query used by a "query-rewriting" mechanism of the database kernel, which modifies original user queries to reference suitable materialized views instead of the originally specified database tables in order to achieve higher performance in processing the queries.

Furthermore, statistics of how these workload queries were classified are collected to record the relative importance of the different structural features. In a preferred embodiment, these statistics are collected in the database kernel so that the recommendations generated by the materialized view selection process is in synch with the needs of the database kernel's rewrite algorithm.

The classification may involve different combinations of different structural features, and in one implementation, each workload query block is categorized with respect to five different structural features: the query's full query join graph, the query's anchor join graph, the measures used in the query, the grouping conditions specified in the query, and the selection predicates in the query.

First statistics are kept on which full query join graphs occur in the workload. A full query join graph is a data structure that represents all the joins in the query. Nodes in the full query join graph correspond to the tables in the FROM-clause of the query, and each join condition of the query is represented by an edge between a pair of nodes that the join condition connects. For example, Query 500 shown in FIG. 5 has four tables in the FROM-clause 511 (SALES 513, TIME 515, STORE 517, and MONTH 519). Each of these tables therefore corresponds to an identically labeled, respective node in the full query join graph. Furthermore, each of the join conditions 523, 525, and 527 in the WHERE-clause 521 corresponds to identically labeled, respective edges 523, 525, and 527 in the full query join graph. Specifically, the join condition SALES.DATE=TIME.DATE 523 involves the tables SALES 513 and TIME 515 and therefore corresponds to edge 523 between node 513 for table SALES table and node 515 for table TIME. Likewise, the join condition SALES.STORE=STORE.STORE 525 and TIME.MONTH=MONTH.MONTH 527 correspond to edges 525 and 527, respectively, in which edge 525 connects SALES node 513 and STORE node 517, and edge 527 connects TIME node 515 and MONTH node 519.

Figure 5:
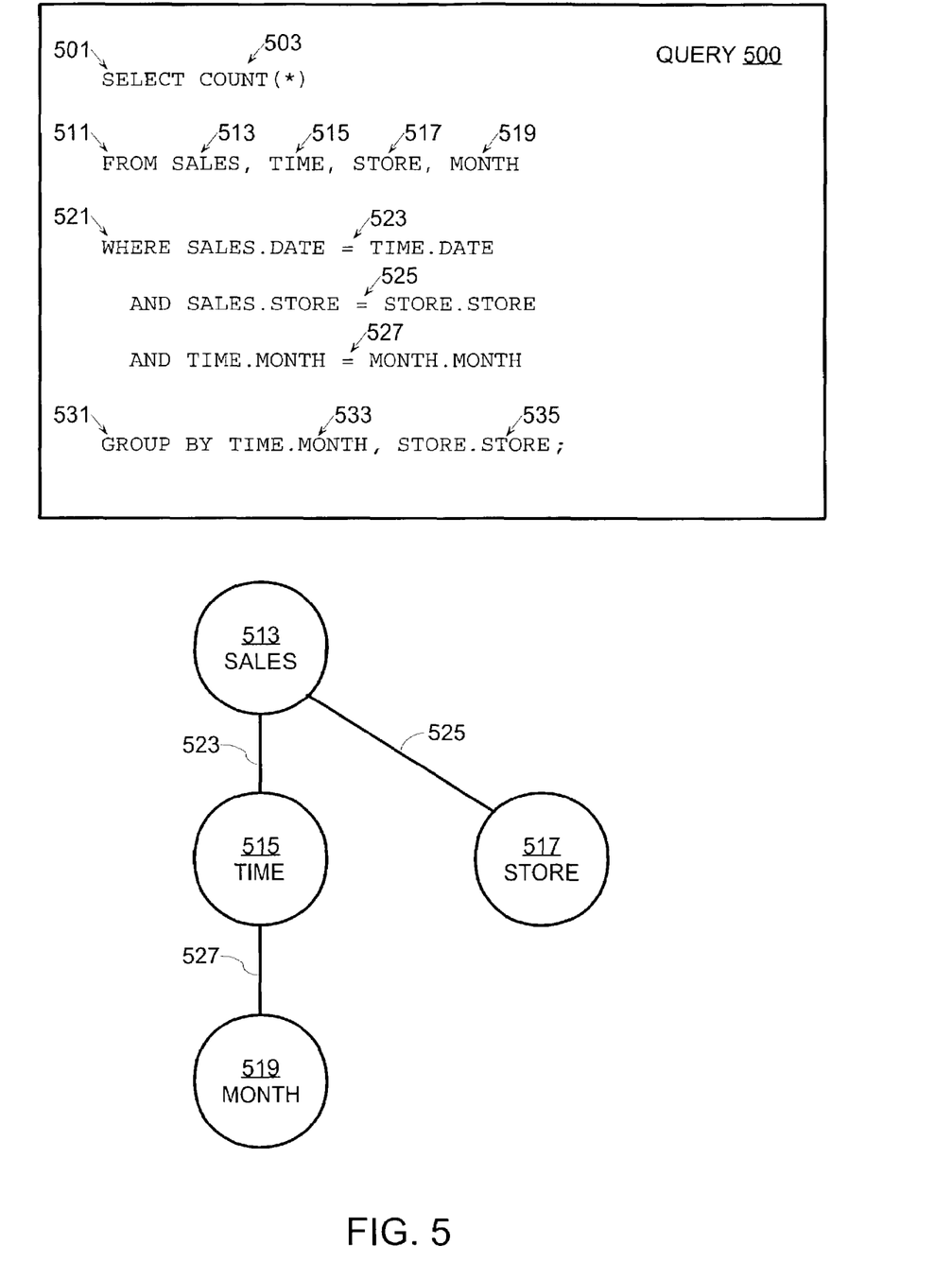
FIG. 5 shows an exemplary query and the full query join graph of the exemplary query.

Statistics are also collected based the anchor join graphs in the workload. An anchor join graph is the smallest sub-graph (in terms of nodes) of a full query join graph such that any joins between the tables in the sub-graph and those outside of the sub-graph must be lossless and any joins between tables outside of the sub-graph are lossless. There are two basic types of join relationships: lossless and lossy. A lossless join is an equijoin (i.e., having join condition of "=" equality) in which one set of join columns from one table is a primary key and the other set of join columns from the other table is the foreign key and has non-null constraints. All other types of joins are considered lossy joins. In the example of FIG. 5, all the joins are lossless, so the smallest sub-graph that satisfies the anchor join graph is the null graph with zero nodes. If, however, the query were such that edge 527 corresponds to a lossy join, then the anchor join graph would consist of nodes 515 and 519 and the edge 527 therebetween.

When comparing anchor join graph structures, the transitive closure of all the equivalent predicates are computed to avoid falsely introducing a new anchor join graph classification. For example, if AJG1 has the predicates $\{t1.a=t2.b$ and $t2.b=t3.c\}$, AJG1 has the predicates $\{t1.a=t3.c$ and $t2.b=t3.c\}$, and AJG3 has the predicates $\{t2.b=t3.c$ and $t1.a=t3.c\}$, then all these queries would be classified under the same anchor join graph because the transitive closure of their anchor join graph structures are identical.

The anchor join graph constitutes a way to partition the mass of workload queries in to tractable subsets. Because anchor join graphs are a sub-graph of the workload's full query join graphs, it is expected that many different full query join graphs in the workload will correspond to an anchor join graph. Furthermore, queries with different anchor join graphs cannot rewrite each other, so the heuristic search space to select the appropriate materialized views can be segmented restricted without adversely affecting the quality of the selected materialized views.

Another feature for which statistics are collected are measures. Measures are aggregates such as SUM, COUNT, AVERAGE, and STDDEV, which are presented in the SELECT-clause 501 of the query. In FIG. 5, the select clause in the Query 500 includes the COUNT aggregate operator 503, so the Query 5 would be classified under the COUNT measure. In one embodiment, measures are normalized to recognize equivalent measures, e.g. COUNT(x+y) and COUNT(y+x) are equivalent, because addition is commutative. To simplify comparison of different measures, the measures are classified based on the text of the normalized measure, which advantageously permits the use of fast string comparison techniques instead of parsing the measures and comparing their resultant parse trees.

Grouping conditions can also serve as a basis for classifying workload queries. The grouping conditions of a query are found in the GROUP BY-clause 531 and are used to view data at different levels of granularity, e.g. annual sales vs. monthly sales. In the case of the Query 500 in FIG. 5, the grouping conditions are TIME.MONTH 533 and STORE.STORE 535. Like the measure classification, grouping conditions are also normalized in order to aggregate equivalent grouping conditions. For example, a materialized view recommendation having "GROUP BY a, b" could satisfy at least the following more complicated grouping conditions: "GROUP BY a+b, a*b" and more generally, "GROUP BY f(a,b)" where f( ) is a deterministic function. Accordingly, queries are classified in terms of grouping conditions based on the columns in the grouping condition. Although grouping conditions classification is not used to partition the search space, they foster the calculation of which points in the search space are relatively more important than others.

A fifth structural feature that can be used to classify queries uses selections predicates (not shown in FIG. 5). Many queries have selection predicates to restrict the range of values in the query. For example, a selection predicate on a DATE column allows data only pertaining to a specific week or month to be fetched. Accordingly, the selection criteria of the workload queries are monitors to ascertain the popular data ranges of a set of workload queries. In one embodiment, slightly different but overlapping selection ranges can be merged into a single value range. For example, if there are many queries with the range Jan. 1, 1999≦DATE≦Mar. 31, 1999 and the range Feb. 1, 1999≦DATE≦Apr. 1, 1999, these ranges can be merged into a single range Jan. 1, 1999≦DATE≦Apr. 1, 1999. Although the use of selection ranges is illustrated with linear, one-dimensional ranges, it is contemplated that rectangular value ranges, involving a plurality of selection ranges on other dimensions or columns, can be used. These aggregate ranges can be found using one of the many data clustering algorithms developed in the data mining art.

Figure 6:
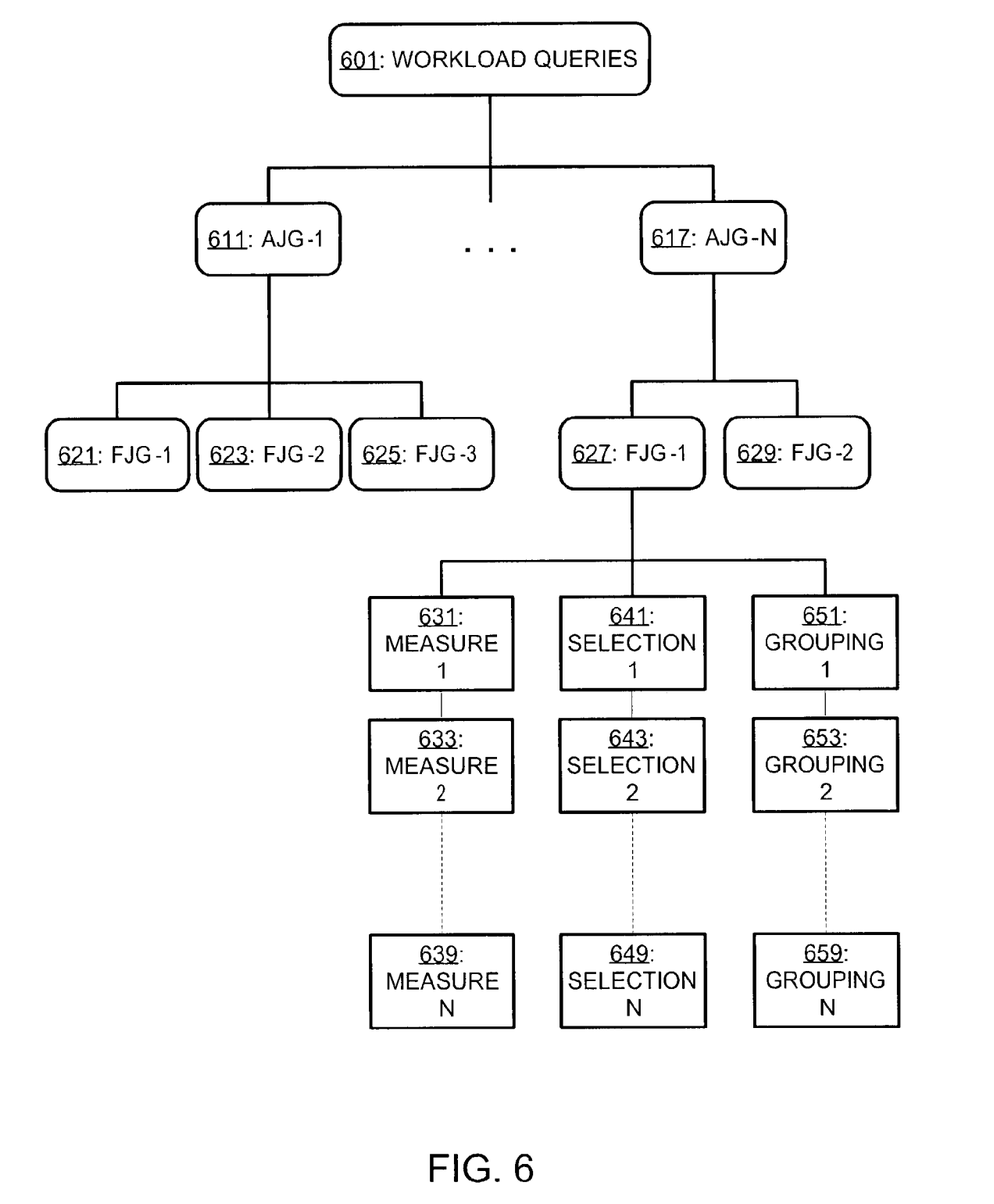
FIG. 6 illustrates the classification hierarchy of one embodiment of the present invention.

These structural features can be hierarchically arranged as depicted in FIG. 6, in which set 601 represents the set of workload queries under consideration. The workload query set 601 can be partitioned into several anchor join graph (AJG) subsets 611 . . . 619 based on the anchor join graphs of the queries in the workload query set 601. Each anchor join graph subset can be further partitioned into sets corresponding to the full query join graphs (FJG) of the queries in the corresponding anchor join graph subset. In FIG. 6, anchor join graph subset 611 is decomposed into three full query join graph subsets 621, 623, and 625, and anchor join graph subset 619 is decomposed into three full query join graph subsets 627 and 629. Furthermore, each query in the full query join graph subset 627 is further characterized in terms of its measure 631, 633, . . . 639, its selection predicates 641, 643, . . . 649, and its grouping conditions 651, 653, . . . 659.

Not every workload query needs to be classified, however. Referring back to FIG. 4, workload queries that can already be adequately rewritten are filtered out of the statistics (step 403). The reason for this filtering is that the purpose is to identify which new materialized views that can be created to reduce query response time. If certain workload queries are already being handled adequately by existing materialized views, then there is no need to consume additional storage for these queries. On the other hand, workloads that are not being adequately rewritten are prime candidates for improvement by identifying an additional materialized view that can be used to speed up query processing.

In one embodiment, the filtering step is integrated inside of the database kernel and reusing many of the data structures and algorithms of the database kernel rewriting code. This embodiment advantageously avoids the mismatch between the rewriting process and the materialized view selection process that often occurs when the code bases for the two processes are entirely independent and maintained by different developers or even vendors. As a result, the quality of the materialized view selection process is very high, because those queries that are actually and already being handled adequately by existing materialized views in the rewriting process are known to the materialized view selection process.

Materialized View Selection

After all the workload statistics have been filtered and collected in steps 401 and 403, the recommendations are generated that identify which materialized views can be created to improve the performance of the workload. Although steps 405, 407, and 409 are indicated as being performed outside the database kernel, the present invention is not so limited, because these steps may also be performed within the kernel.

In accordance with a "divide-and-conquer" strategy, the classification of the workload queries in terms of their full query join graph features permits the search for materialized view to initially be distributed across many independent, small segments rather than for the entire workload as in prior approaches. More specifically, at step 405, a set of independent local search spaces is generated for each of the full join query graph subsets (e.g. one search space for each subsets 621, 623, 625, 627, 629 in FIG. 6). Since the local search space only contains dimensional tables that are actually referenced by the tables in the full query join graph structure, the number of dimensions and the subsequent size of the local search space can be much smaller, and therefore faster, than those found in the global search of prior approaches.

More specifically, the full query join graph classification reduces the search space by subdividing each anchor join graph workload segment, thereby creating smaller search spaces but more search spaces. Each local search space can then be searched to generate recommendations (step 407) using heuristics such as the greedy algorithm described in the background, modified to give additional weight to the measures, selection predicates, and grouping conditions that correspond to multiple kinds of queries. Since the best-performing materialized view selection algorithm known so far is of $O(n^2)$ complexity (where n is the number of points in the search space), the complexity can be reduced by a factor of 1/k, where k is the number of smaller search spaces. The reduction comes from the fact that $kO((n/k)^2)=1/kO(n^2)$. Accordingly, even though the asymptotic bound of the materialized view selection problem is unchanged, particularly when the smaller search spaces are poorly chosen, this search process in typical cases is sped up by k times.

A potential drawback of using many smaller searches partitioned in terms of the full query join graph feature is that the full query join graph does not possess the property that no single recommendation can satisfy two queries with different full query join graph structures, as is the case for anchor join graphs. In other words, it is possible for selected queries from different full query join graph partitions to rewrite each other. Accordingly, to further reduce redundant materialized view recommendations, the local recommendations are merge to generate the global recommendations (step 409) by rerunning the greedy algorithm on the results of step 407. Because the set of local recommendations is much smaller than the total number of queries in the workload, generating the global recommendation is much faster than prior techniques.

Hardware Overview

Figure 7:
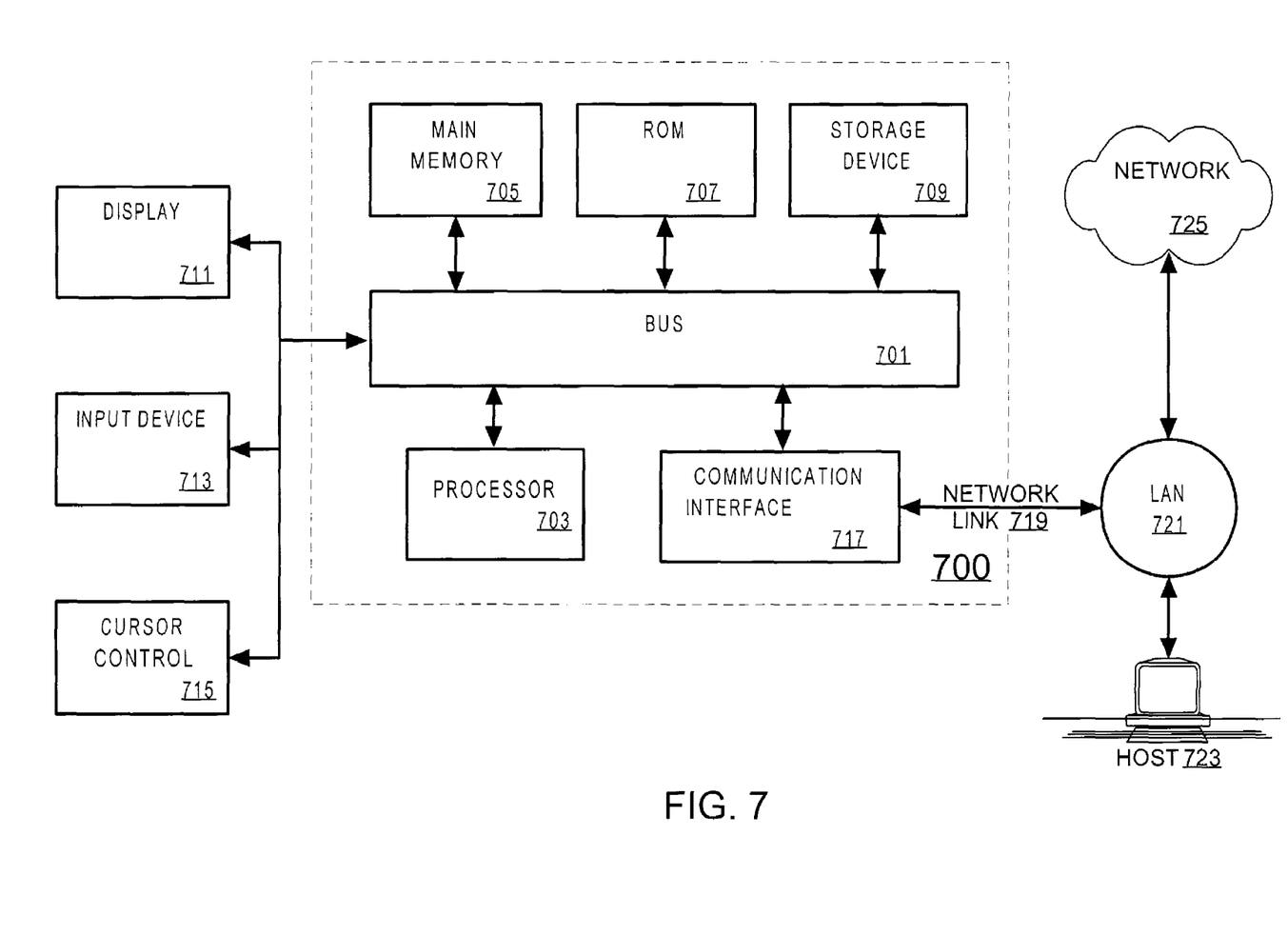
FIG. 7 depicts a computer system that can be used to implement an embodiment of the present invention.

FIG. 7 illustrates a computer system 700 upon which an embodiment according to the present invention can be implemented. The computer system 700 includes a bus 701 or other communication mechanism for communicating information, and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions to be executed by the processor 703. The computer system 700 further includes a read only memory (ROM) 707 or other static storage device coupled to the bus 701 for storing static information and instructions for the processor 703. A storage device 709, such as a magnetic disk or optical disk, is additionally coupled to the bus 701 for storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is cursor control 715, such as a mouse, a trackball, or cursor direction keys for communicating direction information and command selections to the processor 703 and for controlling cursor movement on the display 711.

According to one embodiment of the invention, selecting materialized views is provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, or a telephone modem to provide a data communication connection to a corresponding type of telephone line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by service provider. The local network 721 and network 725 both use electrical, electromagnetic, or optical signals to convey information and instructions. The signals through the various networks and the signals on network link 719 and through communication interface 717, which communicate digital data with computer system 700, are exemplary forms of carrier waves bearing the information and instructions.

The computer system 700 can send messages and receive data, including program code, through the network(s), network link 719, and communication interface 717. In the Internet example, a server (not shown) might transmit requested code belonging to an application program for implementing an embodiment of the present invention through the network 725, local network 721 and communication interface 717. The processor 704 may execute the transmitted code while being received and/or store the code in storage device 79, or other non-volatile storage for later execution. In this manner, computer system 700 may obtain application code in the form of a carrier wave.

The term "computer-readable medium" as used herein refers to any medium that participates in providing instructions to the processor 704 for execution. Such a medium may take many forms, including but not limited to non-volatile media, volatile media, and transmission media. Non-volatile media include, for example, optical or magnetic disks, such as storage device 709. Volatile media include dynamic memory, such as main memory 705. Transmission media include coaxial cables, copper wire, and fiber optics, including the wires that comprise bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for selecting one or more materialized views based on a plurality of user-supplied queries, comprising the steps of:

classifying each of the plurality of user-supplied queries in terms of a full join graph and an anchor join graph wherein the anchor join graph is a smallest sub-graph of the full join graph and wherein any joins between the tables in the sub-graph and those outside the sub-graph are lossless;

selecting a set for materialized views for each set of user-supplied queries of the plurality of user-supplied queries classified to a same full join graph;

selecting the one or more materialized views based on the set of selected materialized views for each set of user-supplied queries classified to a same anchor join graph; and outputting said selected materialized views.

2. A method according to claim 1, wherein the anchor join graph includes a smallest sub-graph of a query join graph such that all joins with tables outside of the sub-graph are lossless.

3. A method according to claim 1, further comprising the step of:

filtering each of the plurality of user-supplied queries to eliminate queries that are rewritten by a database kernel and selecting said one or more materialized views.

4. A method according to claim 1, further comprising the steps of:

resolving group-by expressions of each of the plurality of user-supplied queries into basic columns;

classifying each of the plurality of user-supplied queries in terms of the resolved group-by expressions; and selecting the number of materialized views based on the classified group-by expressions.

5. A method according to claim 1, further comprising the steps of:

classifying each of the plurality of user-supplied queries in terms of classified measures; and selecting the number of materialized views based on the classified measures.

6. A method according to claim 1, further comprising the steps of:

classifying each of the plurality of user-supplied queries in terms of ranges of values; and selecting the number of materialized views based on the classified ranges of values.

7. A computer-readable medium bearing instructions for selecting one or more materialized views based on a plurality of user-supplied queries, said instructions being arranged, when executed, to cause one or more processors to perform the method according to claim 1, wherein the computer-readable medium is one of: volatile memory and non-volatile memory.

8. A method for selecting one or more materialized views based on a plurality of user-supplied queries, comprising the steps of:

filtering each of the plurality of user-supplied queries in the plurality of user-supplied queries to identify user-supplied queries that are written by a data kernel;

classifying a user-supplied query that remains in terms of one or more structural features;

selecting the one or more materialized views based on the classified structural features, wherein the user-supplied query is classified in terms of a full join graph and an anchor join graph wherein the anchor join graph is a smallest sub-graph of the full join graph and wherein any joins between the tables in the sub-graph and those outside the sub-graph are lossless; and outputting said selected one or more materialized views.

9. A method according to claim 8, wherein the classified structural features include one or more of: a full query join graph, an anchor join graph, a measure, a selection predicate, and a grouping condition.

10. A method according to claim 8, wherein:

the classified structural features include at least a full query join graph, an anchor join graph; and said selecting includes:

for each set of the queries classified to a same full join graph, selecting a set of materialized views; and for each set of the queries classified to a same anchor join graph, selecting the one or more materialized views based on the set of selected materialized views.

11. A computer-readable medium bearing instructions for selecting one or more materialized views based on a plurality of user-supplied queries, said instructions being arranged, when executed, to cause one or more processors to perform the method according to claim 8, wherein the computer-readable medium is one of: volatile memory and non-volatile memory.

12. A method for selecting one or more materialized views based on a plurality of user-supplied queries, comprising the steps of:

classifying each of the user-supplied queries in terms of at least a first anchor join graph and a second anchor join graph wherein an anchor join graph is a smallest sub-graph of a full join graph and wherein any joins between the tables in the sub-graph and those outside the sub-graph are lossless;

selecting materialized views for the user-supplied queries classified in terms of the first anchor join graph;

selecting materialized views for the user-supplied queries classified in terms of the second anchor join graph; and outputting said selected materialized views.

13. A computer-readable medium bearing instructions for selecting one or more materialized views based on a plurality of user-supplied queries, said instructions being arranged, when executed, to cause one or more processors to perform the method according to claim 12, wherein the computer-readable medium is one of: volatile memory and non-volatile memory.

14. A system for selecting one or more materialized views based on a plurality of user-supplied queries, comprising:

a processor operable to execute computer program instructions; and a memory operable to store computer program instructions executable by the processor, for performing the steps of:

classifying each of the user-supplied queries in terms of a full join graph and an anchor join graph wherein the anchor join graph is a smallest sub-graph of the full join graph and wherein any joins between the tables in the sub-graph and those outside the sub-graph are lossless, wherein each of the queries is classified in terms of one or more structural features including the full join graph and the anchor join graph;

selecting the one or more materialized views based on said classifying; and outputting said selected one or more materialized views.

* * * * *